United States Patent [19]
Nalle

[11] 3,819,451
[45] June 25, 1974

[54] APPARATUS FOR MAKING INFLATED PLASTIC MESH

[76] Inventor: Alan W. Nalle, 108 West 2nd St., Austin, Tex. 78701

[22] Filed: Dec. 20, 1971

[21] Appl. No.: 210,185

Related U.S. Application Data

[62] Division of Ser. No. 814,550, April 9, 1969, abandoned.

[52] U.S. Cl............... 156/433, 156/167, 156/180, 156/500, 264/167, 264/173, 264/174, 264/176 F, 425/67, 425/71, 425/461, 425/462
[51] Int. Cl........................................ B29b 27/02
[58] Field of Search........... 156/145, 244, 271, 290, 156/441, 500, 510, 167, 180, 433; 425/67, 71, 326, 461, 462, 465; 264/167, 173, 174, 176 F, DIG. 75

[56] References Cited
UNITED STATES PATENTS 3,193,604  7/1965  Mercer ............................ 425/462
3,226,285  12/1965  Iovenko ........................... 156/145
3,308,220  3/1967  Smith............................... 156/244
3,560,306  2/1971  Nalle................................ 156/500

FOREIGN PATENTS OR APPLICATIONS 153,610  10/1953  Australia........................... 156/244

Primary Examiner—Charles E. Van Horn
Assistant Examiner—Caleb Weston
Attorney, Agent, or Firm—Tom Arnold

[57] ABSTRACT

Apparatus for forming an inflated mesh comprising two relatively rotatable dies, a set of extrusion orifices in each of said dies for extruding filaments, gas pressure means in at least one of said set of extrusion orifices for inflating said filaments and heat sealing means to cause said filaments to become bonded to form an inflated plastic mesh product.

16 Claims, 7 Drawing Figures

Alan W. Nalle
INVENTOR

BY Arnold, Roylance
Kruger & Durkee
ATTORNEYS

PATENTED JUN 25 1974 3,819,451

Alan W. Nalle
INVENTOR

BY Arnold, Roylance,
Kruger & Durkee
ATTORNEYS

Alan W. Nalle
INVENTOR

BY Arnold, Roylance,
Kruger & Durkee
ATTORNEYS

APPARATUS FOR MAKING INFLATED PLASTIC MESH

This is a division of application Ser. No. 814,550 filed Apr. 9, 1969 now abandoned.

BACKGROUND

The present invention relates to a novel plastic mesh product and to methods and apparatus for producing the same. More particularly, this invention relates to a novel inflated plastic mesh and to methods and apparatus for producing such a mesh.

Various prior art methods are known for producing packing materials to protect goods in cartons, packages, boxes, and the like from breakage or damage from sudden jarring.

Such packing materials may take the form of shredded paper or plastic, fiberous matting, preformed plastic cartons, etc.

In packing a carton, relatively large amounts of such materials are required to sufficiently cushion the goods. Further, due to the bulk of such packing materials, the effective space available for the goods inside the carton is reduced.

It is a primary feature of this invention to provide a novel compact plastic mesh suitable for packing having inflated plastic filaments. Another feature is the provision of novel techniques and apparatus for producing such plastic mesh.

SUMMARY OF THE INVENTION

In accordance with a first aspect of this invention, there is provided a novel inflated plastic mesh having a first group of parallel filaments and a second group of inflated hollow filaments intersecting and bonded to the filaments of the first group. Each filament of the second group consists of a linear series of sealed, inflated chambers.

In accordance with a second aspect of this invention, a novel method is provided for forming such an inflated mesh from extrudable plastic by extruding a first set of filaments and second set of hollow filaments. As both sets are extruded, gas is forced into the second set of hollow filaments to form inflated filaments and relative movement is caused between the two sets of filaments to produce intersecting contact and bonding between the filaments of the first and second sets to form a mesh product. After the mesh is formed, gas is entrapped within the inflated filaments by applying heat and pressure across the width of the inflated filaments to heat seal such filaments by fusing opposite walls of such filaments together to form the ultimate inflated mesh.

In accordance with a third aspect of this invention, a novel inflated plastic mesh forming apparatus is provided having a die body to hold a supply of extrudable plastic, a first movable die plate having extrusion orifices terminating in discharge openings for extruding a first group of filaments, and a second die plate movable relative the first die plate having extrusion orifices terminating in annular discharge openings for extruding a second group of hollow filaments. Elongated members are centrally supported within each of the extrusion orifices of the second die plate. Gas pressure means forces gas via a conduit into a gas passage through the elongated member, and through the gas passage into the hollow filaments. Means is provided to actuate a heated member disposed transverse the inflated filaments into heat sealing contact with the inflated filaments at predetermined intervals to entrap the gas within the inflated filaments to form the ultimate product.

The instant invention will be more explicitly understood with reference to the accompanying drawings which illustrate specific embodiments in accordance with the invention.

Figure 1:
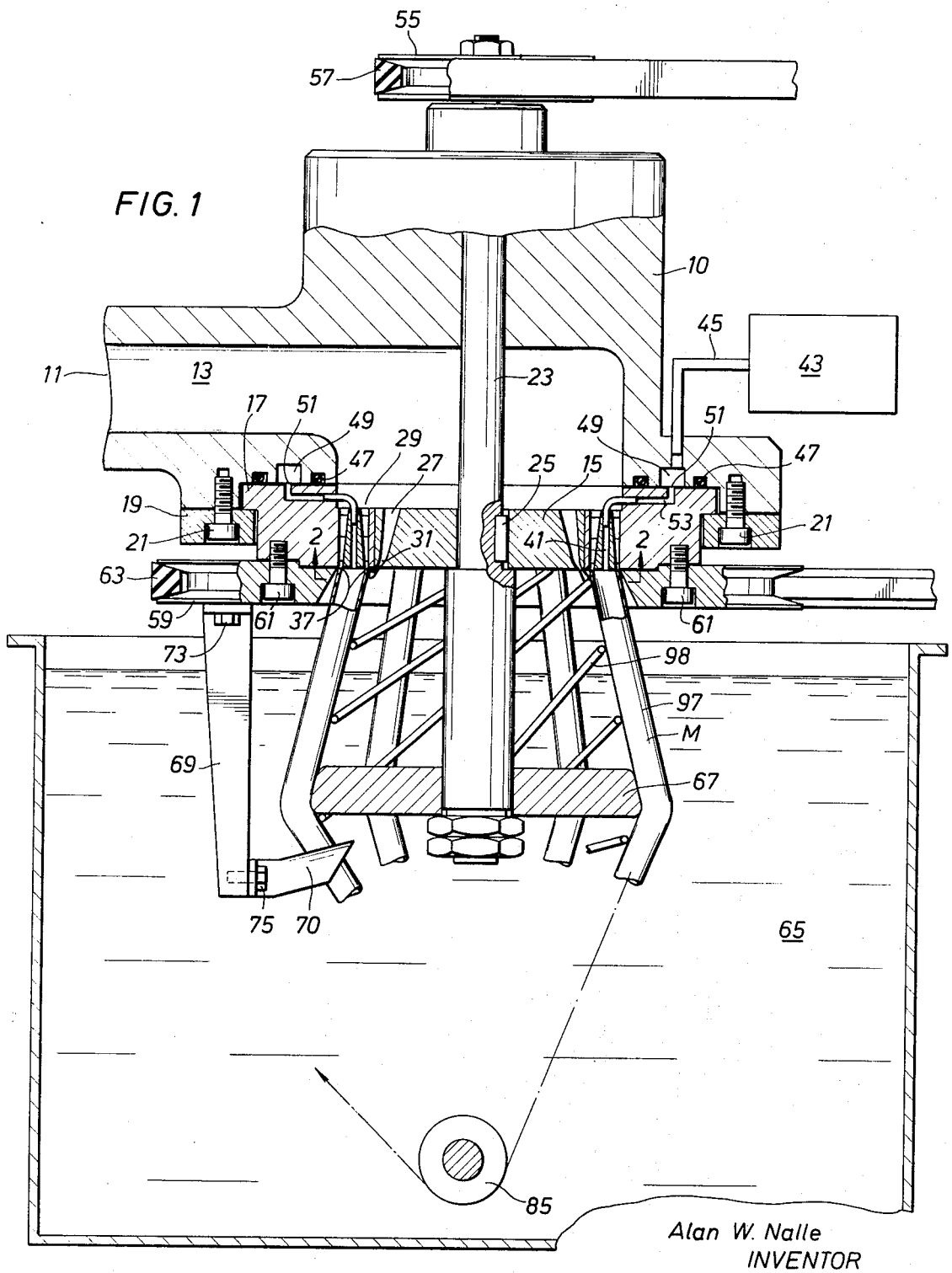
FIG. 1 is a vertical partial sectional view of a novel extrusion apparatus according to an embodiment of this invention.

Referring now to FIG. 1, an inflated plastic mesh extrusion apparatus is shown partially in section. This device consists of a die body 10 located at the discharge end of a container (not shown) holding a supply of extrudable plastic which during operation is under pressure from an extruder screw (not shown) or equivalent pressurizing mechanism and forced through inlet port 11 into a cavity 13. The plastic should be a suitable thermoplastic, such as polyethylene, polypropylene, a polyamide, vinyl polymer or copolymer, acrylic polymer or copolymer, or a cellulosic material.

A die plate assembly includes two relatively rotatable die plates, inner die plate 15 and outer die plate 17, arranged concentrically. While the embodiment of FIG. 1 shows the periphery of inner die plate 15 fit against outer die plate 17, a suitable spacer may separate the two die plates. Outer die plate 17 is supported by a stationary mounting ring 19 removably secured by studs 21 to die body 10, while inner die plate 15 is removably secured to rotate with drive shaft 23 by key 25.

Die plates 15 and 17 respectively have circularly arranged sets of extrusion orifices 27 and 29 extending therethrough, extrusion orifice 27 being wider at its inlet opening than at its discharge opening 31 to provide efficient channeling of the hot plastic into orifice 27. Orifice 29 will be explained in detail below.

Figure 2:
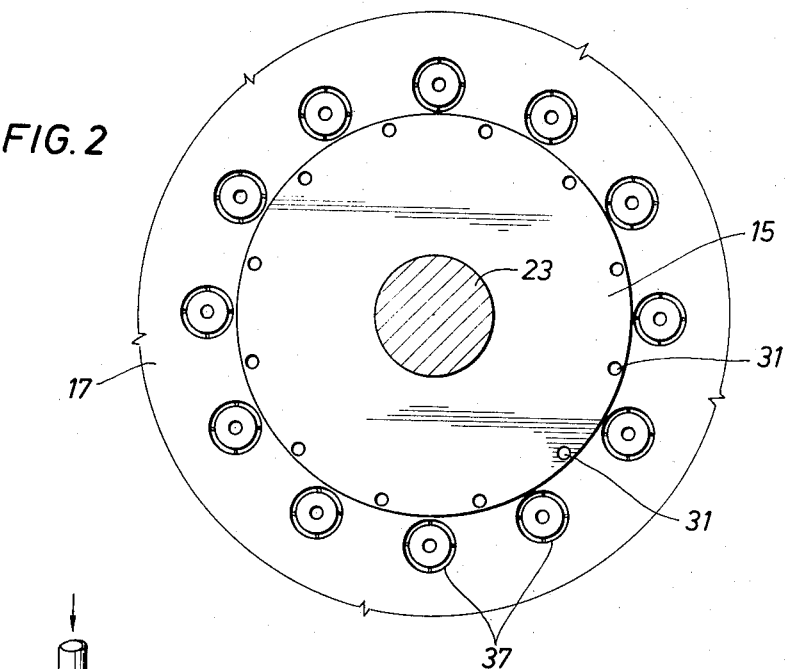
FIG. 2 is a view taken along line 2—2 of FIG. 1 showing the disposition of the discharge openings of the dies.

FIG. 2 shows the discharge side of the die plate assembly of FIG. 1. Extrusion orifices 27 have discharge openings 31 for extruding noninflated filaments arranged in a first extrusion circle in die plate 15 while extrusion orifices 29 have annular discharge openings 37 for extruding inflated hollow filaments arranged in a second extrusion circle concentric with the first extrusion circle.

Discharge opening 31 may be circular as shown, or rectangular, scalloped, ribbonlike, or of other desired shapes. Also, while discharge opening 37 is shown to be annular or ring-like, it may be ellipsoidal, rectangular, or of other convenient closed shape. The typical diameter of the hollow filaments extruded from discharge opening 37 is from about one-fourth to about 1 inch, while the wall thickness of the inflated filament is typically 10 to 50 mils. The hollow filaments may be varied in ultimate diameter and wall thickness by controlling the pressure of the gas forced therein as will be appreciated in view of the art and the disclosure below. The thickness of the noninflated filament extruded from discharge opening 31 is typically 15 to 100 mils.

Figure 3:
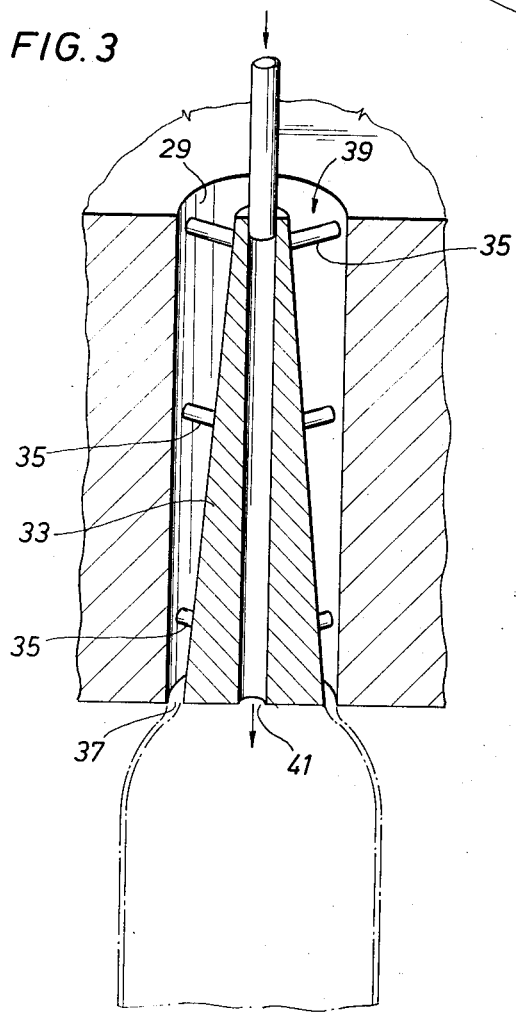
FIG. 3 is a detailed, perspective, sectional view of an inflation type extrusion orifice.

FIG. 3 shows a detailed, perspective sectional view of extrusion orifice 29. An elongated conical member 33 is centrally supported within orifice 29 by "spider" supports 35 from the walls of orifice 29. Orifice 29 terminates in annular discharge opening 37 defined by the annular space between member 33 and the walls of orifice 29.

The smaller end of member 33 is disposed in inlet opening 39 to provide efficient channeling of the hot plastic into orifice 29, while supports 35 are spaced from annular discharge opening 39 to permit the plastic to flow uninterrupted from the annular discharge opening.

A gas passage 41 is provided through member 33 through which gas is forced into the hollow filaments to inflate the hollow filaments. A gas pressure means delivers gas, e.g., air or an inert gas such as nitrogen, to the hollow filaments 97.

Referring again to FIG. 1, a gas pressure generator such as a small compressor 43 forces gas through gas pipe 45 into a toroidal cavity 49 in die body 10. Outer die plate 17 is in gas-sealing, sliding contact with O-rings 47 concentric with the bottom of cavity 49. An annular slot 51 in the bottom of cavity 49 communicates with a conduit 53 connected to gas passage 41 in each conical member 33.

During operation, groups of filaments are extruded from discharge openings 31 and 37, respectively, and move in intersecting coaxial paths when the die plates are moved relative to each other. The hollow filaments are inflated with gas, as described above, as they are extruded from annular discharge openings 37. Since the discharge openings in each die plate are spaced from the edge of the die plates, as shown in FIG. 2, bonding occurs in free space, i.e., in mid air. As the filaments intersect, the plastic is still hot enough so that bonding takes place at the point of contact where intersection occurs to form a unitary inflated tubular plastic mesh M.

Alternatively to the free-space technique described above, methods and apparatus for bonding of filaments can be used whereby the filaments intersect inside the die plates at the edge of the die plates. Also, while the annular discharge openings 37 are shown in outer die plate 17, apparatus can be used in which the inner die plate 15 is provided with the annular discharge openings; however, the die plate assembly embodiment of FIGS. 1 and 2 is preferred since the inflated filaments are less likely to inadvertently bond to each other or to the mesh when the inflated filaments are disposed as the outermost set of filaments.

Relative rotation of the die plates is necessary to form the novel inflated mesh. Inner die plate 15 may be rotated in either direction while outer die plate 17 rotates in the opposite direction; or both die plates may rotate in the same direction at different speeds; or one die plate can be maintained stationary while the other is rotated, to achieve a relative movement of the die plates. However, in a preferred embodiment, outer die plate 17 is maintained stationary, while inner die plate 15 is rotated to produce an intersectional pattern of sets of filaments which admits conveniently to cutting mesh M, which will be described below.

Any suitable means for rotating the die plates can be used, for example, a first drive pulley 55 is fixed to drive shaft 23 and adapted to be turned by V-belt 57 connected to a suitable power means (not shown) thereby to rotate inner die plate 15.

A second drive pulley 59 removably secured to die plate 17 by studs 61 is adapted to be turned by V-belt 63 connected to a suitable power means (not shown) thereby to rotate outer die plate 17.

While the relative movement of the die plates of the embodiment described herein is rotative and the discharge openings arranged in circular series, the invention equally admits to discharge openings arranged in an arc, the relative movement achieved by arcuate or oscillatory movement of the die plates. Indeed, in other effective embodiments, the extrusion orifices and discharge openings could be arranged rectilinearly, while relative movement of the series of discharge openings could be achieved by reciprocal displacement of the die plates.

Also, while only one group of inflated filaments is shown, other equally effective embodiments admit to producing both groups as inflated filaments. For example, each die plate could contain a linearly arranged series of annular discharge openings 37, each series being parallel to the other. Again, relative movement of the series of discharge openings is achieved by reciprocal movement of the die plates.

Mesh M is produced, as described above, and allowed to set by promptly introducing the mesh into a cooling medium, such as liquid bath 65, or some other suitable cooling fluid, such as expanding gas. The hot plastic needs to be cooled so that filaments will not inadvertently deform or sag into contact with and bond to each other during cutting and sealing, described below.

A mandrel or spreader 67 is disposed in bath 65 to stretch and size the mesh a desired amount after the plastic has set. The diameter of mandrel 65 may vary depending on the desired size of the ultimate mesh product, since sizing of the mesh is a prime function of the mandrel. Most typically, therefore, the mandrel is of a diameter greater than the outer extrusion circle of filaments. Mandrel 67 has a smooth circular periphery and is loosely mounted on shaft 23 so as to present little resistance to the mesh as it is pulled thereover.

Cutting arm 69 is removably secured to pulley 59 by stud 73 while knife edge 70 is removably secured to arm 69 by stud 75.

As the tubular mesh is drawn over mandrel 67, knife edge 70 is maintained between two adjacent inflated filaments to cut the noninflated filaments. Cutting means 70 is maintained stationary, since the path between any two inflated filaments would pass over the same point on ther periphery of mandrel 67, die plate 17 being maintained stationary. The cut mesh is then drawn under roller 85 in a continuous flat sheet by suitable power means (not shown).

Figure 4:
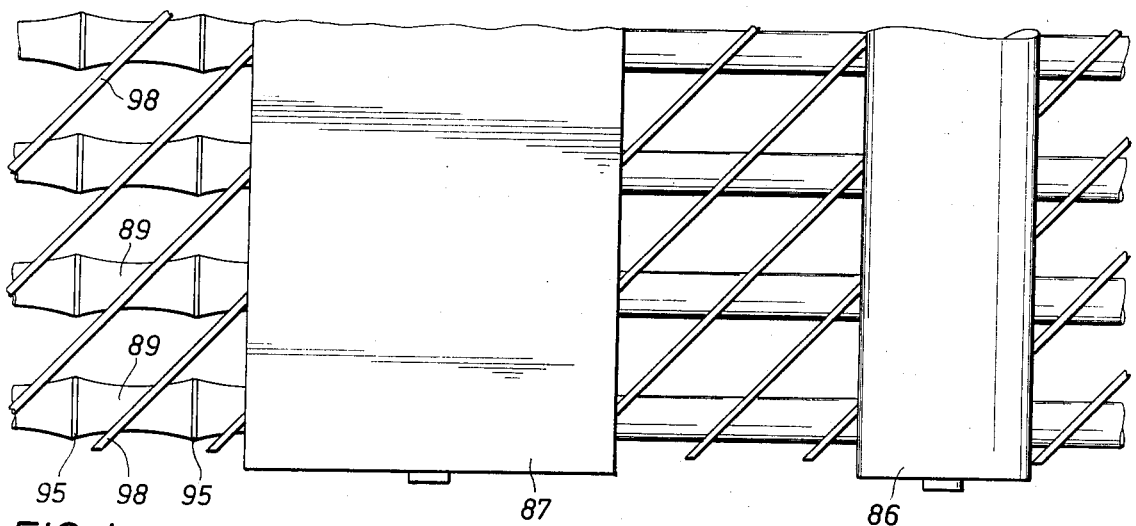
FIG. 4 is a top view of the heat sealer according to an embodiment of this invention.

In FIG. 4, the cut mesh, after being drawn from bath 65, is passed under a roller 86 and between backing roller 81 and heat sealer 87 which forms inflated pockets or chambers 89 in each inflated filament.

Figure 6:
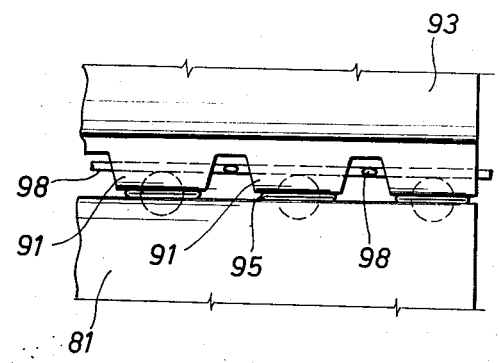
FIG. 6 is a front sectional view of the heat sealer taken along line 6—6 of FIG. 5.

FIG. 6 shows a front sectional view of heat sealer 87 including bars 91 having heated outer surfaces disposed in rows axially at the periphery of rotatable cylinder 93 and transverse the inflated filaments.

Figure 5:
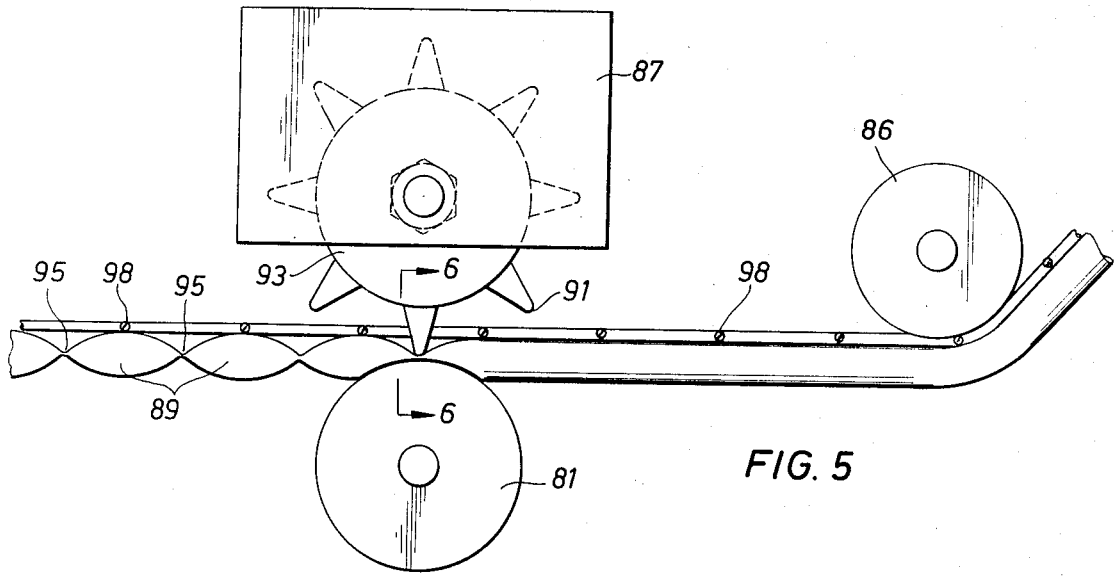
FIG. 5 is a vertical sectional view of the heat sealer of FIG. 4.

In FIG. 5, as the flat mesh passes under heat sealer 87, power means (not shown) in sealer 87 rotates bars 91, each having a series of notches 92 to straddle noninflated filaments to prevent severing thereof, into intermittent contact with the inflated filaments at predetermined intervals. The pressure and heat of bars 91 across the inflated filaments heat seals the inflated filaments, as indicated by reference numeral 95, by fusing opposite walls of the inflated filaments together to entrap the gas within the inflated filaments, thus forming a linear series of sealed, inflated chambers 89 in each inflated filament. Each heated bar 91 is at least as wide as an inflated filament and adjacent bars are spaced such that the uninflated filaments 98 are not contacted by bars 91 (see FIG. 6). The heat sealing operation may also be conducted by passing the mesh through a heat sealing apparatus as shown in FIG. 5 so that the noninflated filament side of the mesh is in contact with backing roller 81. Contacting the noninflated filaments directly with the heat sealing bar is not preferred since the noninflated filaments may be severed or the decorative effects of contrasting colors in hollow and solid filaments might be impaired. However, while a notched bar 91 has certain advantages as explained above, utilization of a notched bar as shown is convenient only when inflated filaments 89 always pass under bar 91 at the same point, i.e., each inflated filament always passes through its respective notch. This is possible only if outer die plate 17 remains stationary. However, it may be desired to rotate outer die plate 17 or both die plates 15 and 17. Accordingly, bar 91 may be straight and flat. Severing the uninflated filaments is then prevented by controlling contacting pressure by proper relative spacing of cylinder 93 and backing roller 81.

Cylinder 93 is rotated in the same direction as roller 85 so that bars 91 can contact and seal the inflated filaments without requiring that the mesh be stopped to prevent distorting the plastic around seal 95 caused by a sudden grabbing or pinching of the inflated filaments when contacted by bars 91.

Desired filament sizes of the inflated mesh can be achieved by proper selection of the size of the discharge openings in the respective die plates. Control of the relative spacing between adjacent filaments is achieved in a well-known manner by proper selection of the speed of die plate rotation and rate of extrusion.

The length of inflated chambers 89 can be varied by proper selection of speed of rotating bars 91 relative the mesh, while control of gas pressure generator 43 will determine the extent to which the hollow filaments are inflated, and hence, each chamber 89.

Figure 7:
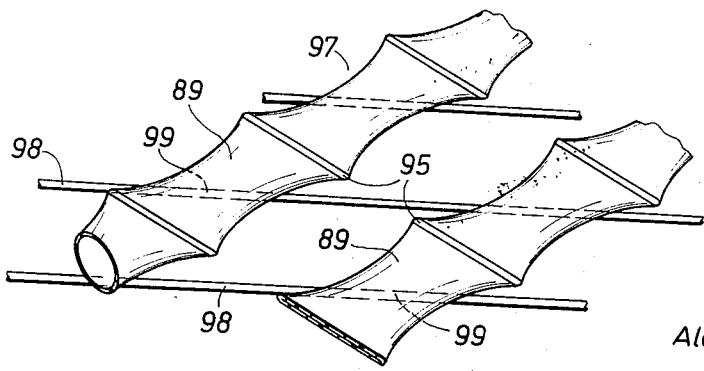
FIG. 7 is a diagrammatic perspective view showing the novel inflated plastic mesh product according to an embodiment of this invention.

FIG. 7 shows a portion of the type of novel inflated mesh product from the apparatus described above. Parallel inflated filaments 97 are bonded at 99 to intersecting parallel noninflated filaments 98. Each inflated filaments 97 consists of a linear series of sealed inflated chambers 89.

A multicolored or multitextured inflated mesh can be produced by providing separate chambers in die body 10 by placing a suitable partition between die plates 15 and 17, each chamber supplying a different colored plastic or extrusion material to each set of extrusion orifices. Also, a different colored plastic or extrusion material could be supplied to each extrusion orifice. This would be conveniently achieved for example, in an extrusion device having rectilinearly arranged extrusion orifices and discharge openings, relative movement of the discharge openings being achieved by reciprocal motion of the die plates, as explained above.

What is claimed is:

1. An inflated plastic mesh forming apparatus, comprising:
   a die body to hold a supply of extrudable plastic;
   a first movable die plate having a first set of extrusion orifices terminating in a first series of discharge openings for extruding a first group of filaments;
   a second die plate having a second set of extrusion orifices terminating in a second series of annular discharge openings, said second die plate being movable relative to said first die plate for extruding a second group of hollow filaments intersecting and bonded to said filaments of said first group at said intersections to define a mesh;
   gas pressure means terminating within each of said annular discharge openings to force a gas into said hollow filaments to inflate said hollow filaments; and
   sealing means for sealing said gas within said inflated filaments.

2. Apparatus according to claim 1, wherein the discharge openings in each of said die plates are spaced from the edges of said die plates.

3. Apparatus according to claim 1, including a liquid bath for cooling the mesh after extrusion.

4. Apparatus according to claim 1, wherein:
   said discharge openings in said first movable die plate are arranged in a first extrusion circle;
   said discharge openings in said second movable die plate are arranged in a second extrusion circle concentric with said first extrusion circle;
   and including means to rotate said first die plate relative said second die plate.

5. Apparatus according to claim 4, including:
   an elongated member centrally supported within each of said extrusion orifices in said second die plate;
   a gas compressor;
   a gas passage centrally through each of said elongated members; and
   conduit means in communication with said gas compressor and said gas passages to conduct gas into said hollow filaments,
   said annular discharge openings in said second die plate being defined by the annular space between said elongated members and the walls of said extrusion orifices in which each elongated member is supported.

6. Apparatus according to claim 5, wherein, said elongated member is supported in said extrusion orifice by a spider support from the walls of said extrusion orifice, said spider support being spaced from said annular discharge opening to permit plastic to flow uninterrupted from said annular discharge opening.

7. Apparatus according to claim 4, including:
   a mandrel concentric with and having a diameter greater than the diameter of said first and said second extrusion circles for sizing the mesh; and
   cutting means having a knife edge, said knife edge being maintained between two adjacent inflated filaments to cut the filaments of said first group.

8. Apparatus according to claim 7, wherein said second die plate and said cutting means are maintained stationary.

9. Apparatus according to claim 4, wherein said sealing means comprises heat sealing means for sealing said inflated filaments across the width thereof.

10. Apparatus according to claim 9, wherein said heat sealing means includes a heated member disposed transverse said inflated filaments and means to actuate said heated member into contact with the mesh to heat seal together opposing walls of said inflated filaments at predetermined intervals to entrap said gas within said inflated filaments.

11. Apparatus according to claim 9, wherein said heat sealing means includes:
  a rotatable member having at least one outer heated surface; and
  means to rotate said rotatable member into intermittent contact with said inflated filaments to form a linear series of sealed, inflated chambers in said inflated filaments.

12. Apparatus for forming an inflated plastic mesh, comprising:
  a die body to hold a supply of extrudable plastic;
  a first movable die plate having a first set of extrusion orifices terminating in a first series of discharge openings arranged in a first extrusion circle for extruding a first group of filaments;
  a second die plate having a second set of extrusion orifices terminating in a second series of annular discharge openings arranged in a second extrusion circle concentric with said first extrusion circle for extruding a second group of hollow filaments;
  means for moving said first die plate relative said second die plate for intersecting and bonding said filaments of said first group to said filaments of said second group at said intersections;
  gas pressure means terminating in each of said annular discharge openings to force a gas into said hollow filaments to inflate said hollow filaments; and
  sealing means for sealing said gas within said inflated filaments.

13. Apparatus according to claim 12, including:
  a mandrel concentric with and having a diameter greater than the diameter of said first and second extrusion circles for sizing the mesh; and
  cutting means having a knife edge, said knife edge being maintained between two adjacent inflated filaments to cut the filaments of said first group.

14. Apparatus according to claim 13, wherein said sealing means includes a heated member disposed transverse said inflated filaments and means to actuate said heated member into contact with the mesh to heat-seal together opposing walls of said inflated filaments at predetermined intervals to entrap said gas within said inflated filaments.

15. Apparatus according to claim 14, wherein said heat sealing means includes a rotatable member having at least one outer heated surface and means to rotate said rotatable member into intermittent contact with said inflated filaments to form a linear series of sealed, inflated chambers in said inflated filaments.

16. Apparatus according to claim 15, wherein the outer heated surface of said rotatable member includes a plurality of notches adapted to straddle said non-inflated filaments.

* * * * *